United States Patent [19]

Cheek et al.

[11] 3,891,982

[45] June 24, 1975

[54] COMPUTER DISPLAY TERMINAL

[75] Inventors: Thomas B. Cheek, Lexington; Daniel E. Thornhill, Brookline; Ronald B. Stewart, Arlington, all of Mass.

[73] Assignee: Adage, Inc., Boston, Mass.

[22] Filed: May 23, 1973

[21] Appl. No.: 362,952

[52] U.S. Cl. .......................... 340/324 AD; 178/6.8

[51] Int. Cl. ............................................. G08b 5/36

[58] Field of Search ......................... 178/6.8, 7.5 D; 340/324 AD, 172.5

[56] References Cited

UNITED STATES PATENTS

| | | | |
|---|---|---|---|
| 3,396,377 | 8/1968 | Strout | 340/324 AD |
| 3,400,377 | 9/1968 | Lee | 340/324 AD |
| 3,581,290 | 5/1971 | Sugarman | 340/172.5 |
| 3,598,911 | 8/1971 | Helbig | 340/324 AD |
| 3,675,232 | 7/1972 | Strout | 340/324 AD |
| 3,787,833 | 1/1974 | Rogers | 340/324 AD |

*Primary Examiner*—David L. Trafton
*Attorney, Agent, or Firm*—Kenway & Jenney

[57] ABSTRACT

The computer display terminal disclosed herein employs a raster scan type display. For the purpose of encoding and manipulating the data which defines an image to be displayed, the scan area is considered to be divided into a rectilinear array of cells, i.e. rows and columns. The data defining the overall image is coded as a succession of data words, each representing a relatively simple image component lying within a single cell. To permit relatively complex images to be displayed, the apparatus permits more than one such image component to be displayed within a single cell. As successive data words representing image components in a single cell are read out of a serial memory and decoded to define respective image elements, an accumulator register sums the contributions of all the image components before the cumulative result is read out to the display device.

10 Claims, 9 Drawing Figures

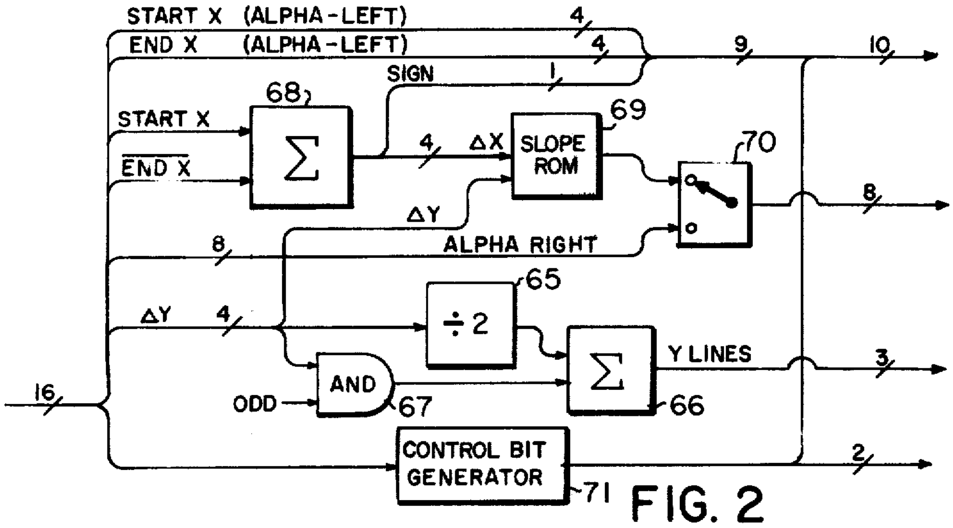

FIG. 2

| BIT POSITION | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| ADDRESS | $A_2$ | $A_1$ | $Y_6$ | 1 | $Y_{15}$ ----------- $Y_0$ | | | | | | $Y_6$ | 1 | $X_5$ ----------- $X_0$ | | | | | |
| GRAPHIC | B | EC | SY | | | | SX | | | | DY | | | | $\overline{EX}$ | | | |
| ALPHA | B | EC | 1 | $L_6$ ----------- $L_0$ | | | | | | | 1 | $R_6$ ----------- $R_0$ | | | | | | |

FIG. 4

| | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| ALPHA | | | | 0 | 0 | 1 | EC | – | $L_6$ | $L_5$ | $L_4$ | $L_3$ | $L_2$ | $L_1$ | $L_0$ | – | $R_6$ | $R_5$ | $R_4$ | $R_3$ | $R_2$ | $R_1$ | $R_0$ |
| VECTOR BEFORE START | Y LINES | | | 1 | 0 | S | EC | SY | | | | SX | | | | INTERSECT LENGTH (IL) | | | | | | | |
| VECTOR AT START | Y LINES | | | 1 | 1 | S | EC | SY | | | | SX | | | | INTERSECT LENGTH (IL) | | | | | | | |
| VECTOR WHILE RUNNING | Y LINES LEFT | | | 0 | 1 | S | EC | XF | | | | EXIT | | | | INTERSECT LENGTH (IL) | | | | | | | |
| VECTOR WHEN DONE | | | | 0 | 0 | 0 | EC | ------------------------ | | | | | | | | ------------------------ | | | | | | | |

SYOK (bit 19) VGGO (bit 18) SIGN (bit 17)

FIG. 5

| | SYOK | VGGO | SIGN | TUY ≥ SY | SYTF | YLIN = 0 | SYOK' | VGGO' | SIGN' | SW 75 | SW 76 | SW 74 | SW 86 | VROM | SROM |
|---|---|---|---|---|---|---|---|---|---|---|---|---|---|---|---|
| ALPHA | 0 | 0 | 1 | Ø | Ø | Ø | 0 | 0 | 1 | X0 | Ø | X1 | Ø | 0 | 1 |
| BEFORE VECTOR | 1 | 0 | Ø | F | Ø | Ø | 1 | 0 | S | X0 | Ø | X1 | 0 | 0 | 0 |
| ↓ | 1 | 0 | Ø | T | Ø | Ø | 1 | 1 | S | X0 | Ø | X1 | 0 | 0 | 0 |
| VECTOR START | 1 | 1 | Ø | T | F | F | 0 | 1 | S | X2 | X1 | -BIAS +BIAS | -1 | 1 | 0 |
| │ | 1 | 1 | Ø | T | T | F | 0 | 1 | S | X1 | X0 | -BIAS +BIAS | -1 | 1 | 0 |
| ↓ | 1 | 1 | Ø | T | T | T | 0 | 0 | 0 | Ø | Ø | Ø | -1 | 1 | 0 |
| VECTOR RUNNING | 0 | 1 | Ø | Ø | Ø | F | 0 | 1 | S | X2 | X1 | X1 | -1 | 1 | 0 |
| ↓ | 0 | 1 | Ø | Ø | Ø | T | 0 | 0 | 0 | X2 | X1 | X1 | -1 | 1 | 0 |
| VECTOR DONE | 0 | 0 | 0 | Ø | Ø | Ø | 0 | 0 | 0 | Ø | Ø | Ø | -1 | 0 | 0 |

INPUTS OUTPUTS

FIG. 6

| LINE | | YLIN | SYOK | VGGO | SIGN | SY/SX OR EXIT | IL | ENTRY | VROM |
|---|---|---|---|---|---|---|---|---|---|
| 0 | VGR | 2 | 1 | 0 | + | 4/2 | 2.0 | – | – |
| | PGR | 2 | 1 | 0 | + | 4/2 | 2.0 | Ø | 0 |
| 2 | VGR | 2 | 1 | 0 | + | 4/2 | 2.0 | – | – |
| | PGR | 2 | 1 | 1 | + | 4/2 | 2.0 | Ø | 0 |
| 4 | VGR | 2 | 1 | 1 | + | 4/2 | 2.0 | – | – |
| | PGR | 1 | 0 | 1 | + | 4.5 | 2.0 | 2.5 | 1 |
| 6 | VGR | 1 | 0 | 1 | + | 4.5 | 2.0 | – | – |
| | PGR | 0 | 0 | 1 | + | 8.5 | 2.0 | 6.5 | 1 |
| 8 | VGR | 0 | 0 | 1 | + | 8.5 | 2.0 | – | – |
| | PGR | -1 | 0 | 0 | 0 | 12.5 | 2.0 | 10.5 | 1 |
| 10, 12, 14 | VGR | -1 | 0 | 0 | 0 | Ø | Ø | – | – |
| | PGR | -1 | 0 | 0 | 0 | Ø | Ø | Ø | 0 |

FIG. 7

| LINE | | YLIN | SYOK | VGGO | SIGN | SY/SX OR EXIT | IL | ENTRY | VROM |
|---|---|---|---|---|---|---|---|---|---|
| 1 | VGR | 2 | 1 | 0 | + | 4/2 | 2.0 | – | – |
| | PGR | 2 | 1 | 0 | + | 4/2 | 2.0 | Ø | 0 |
| 3 | VGR | 2 | 1 | 0 | + | 4/2 | 2.0 | – | – |
| | PGR | 2 | 1 | 1 | + | 4/2 | 2.0 | Ø | 0 |
| 5 | VGR | 2 | 1 | 1 | + | 4/2 | 2.0 | – | – |
| | PGR | 1 | 0 | 1 | + | 6.5 | 2.0 | 4.5 | 1 |
| 7 | VGR | 1 | 0 | 1 | + | 6.5 | 2.0 | – | – |
| | PGR | 0 | 0 | 1 | + | 10.5 | 2.0 | 8.5 | 1 |
| 9 | VGR | 0 | 0 | 1 | ∓ | 10.5 | 2.0 | – | – |
| | PGR | -1 | 0 | 0 | 0 | 14.5 | 2.0 | 12.5 | 1 |
| 11,13,15 | VGR | -1 | 0 | 0 | 0 | Ø | 2.0 | – | – |
| | PGR | -1 | 0 | 0 | 0 | Ø | 2.0 | Ø | 0 |

FIG. 8

COMPUTER DISPLAY TERMINAL

BACKGROUND OF THE INVENTION

This invention relates to a computer display terminal and more particularly to such a terminal which employs a raster scan display device and is capable of displaying both alphanumerics and graphics.

While relatively low cost, TV-type, raster scan displays have heretofore been widely used for displaying alphanumeric data, e.g, in computer terminals, the generation of graphics such as charts, drawings and graphs, has typically required the use of a random scan CRT in which the beam traces the outline of the object being plotted. Either the image must be repetitively refreshed or the CRT must be of the storage tube type. As is understood, such devices are substantially more expensive than raster scan displays.

Among the several objects of the present invention may be noted the provision of a computer display system which is capable of displaying both alphanumerics and graphics; the provision of such a system which is capable of displaying relatively complex images; the provision of such a system which is capable of displaying images having multiple image components in a single relatively small area of the display; the provision of such a system which accepts display lists in computer compatible data formats; the provision of such a system which provides its own refresh capability; the provision of such a system which requires only a relatively small image refresh memory; the provision of such a system in which images stored in the system can be read back to a controlling computer in compatible data format; the provision of such a system which operates at high speed and the provision of such a system which is reliable and which is of relatively simple and inexpensive construction. Other objects and features will be in part apparent and in part pointed out hereinafter.

SUMMARY OF THE INVENTION

Briefly, apparatus according to the present invention is operative to repetitively generate a video signal for driving a raster scan display from data encoded in data words representing respective image components. The raster scan is considered as being divisible into a rectilinear array of rows and columns of cells, each image component as encoded lying with a single cell. More than one image component can be provided in each cell.

The apparatus includes a serial refresh memory for holding, in cell order, data words defining an image to be displayed. The contents of this memory are selectively advanced to read out all data words pertaining to a given cell and as those data words are successively read out, they are decoded to generate signals defining corresponding image elements. An accumulator register accumulates the picture elements defined by a succession of data words pertaining to a given cell and means are provided for storing and serially reading out the accumulated data as a video signal to the raster scan display.

BRIEF DESCRIPTION OF THE DRAWINGS

FIG. 2 is a schematic block diagram of a data word pre-processor employed in the system of FIG. 1;

FIG. 4 illustrates the data format used in a display memory employed in the system of FIG. 1;

FIG. 5 illustrates the data format used in a buffer memory employed in the system of FIG. 1;

FIG. 6 is a chart defining the operation of control logic employed in the system of FIG. 1;

FIGS. 7 and 8 are charts illustrating data values and signal states occurring in the operation of the system of FIG. 1 on even and odd raster scan fields, respectively, during the display of a representative of the vector segment.

Corresponding reference characters indicate corresponding parts throughout the several views of the drawings.

DESCRIPTION OF THE PREFERRED EMBODIMENT

Figure 1:
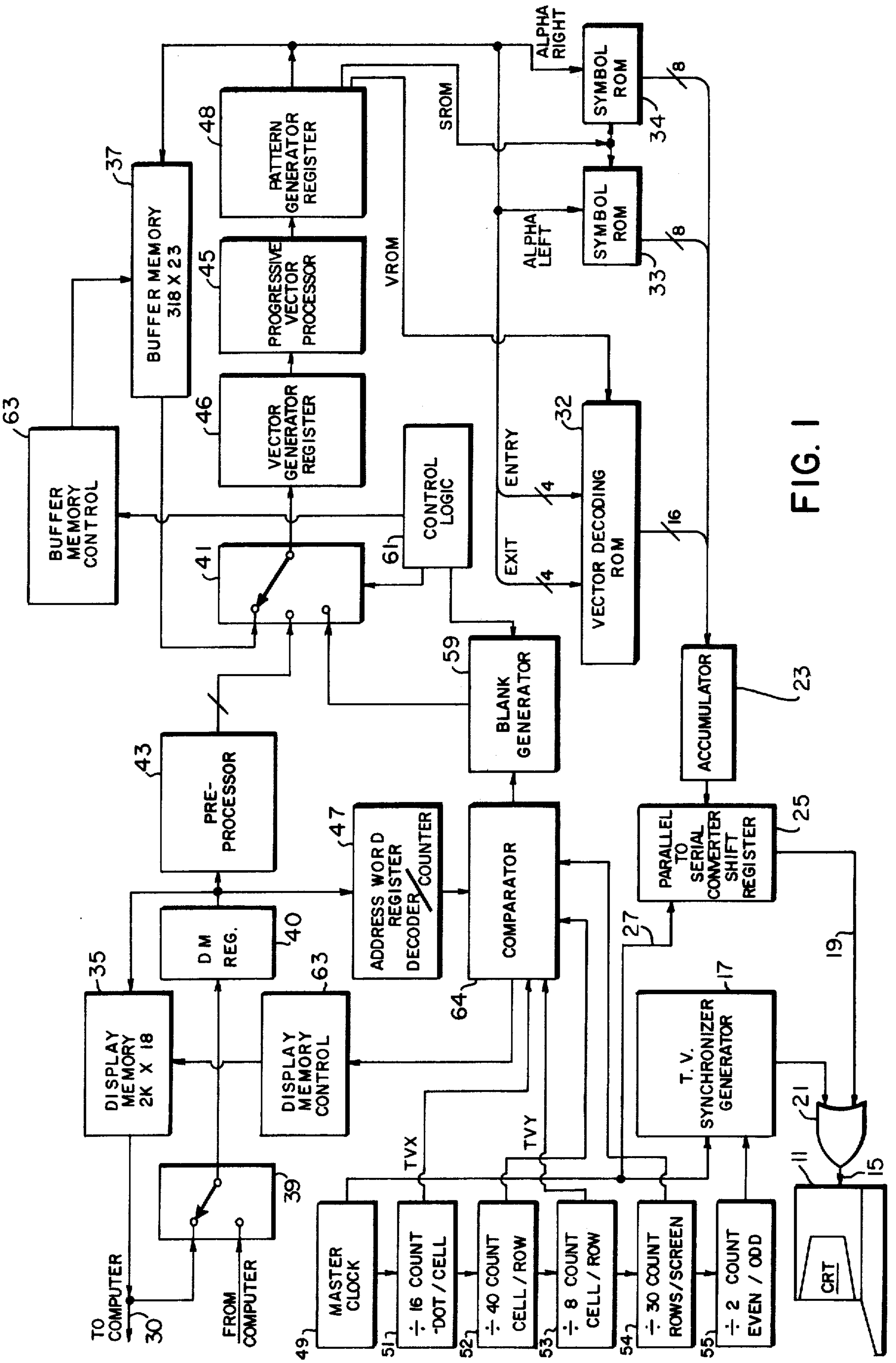
FIG. 1 is a schematic block diagram of a computer display terminal constructed in accordance with the present invention.

Referring now to FIG. 1, a conventional raster scan display device is indicated at 11. This device may, for example, comprise a television-type cathode-ray tube (CRT), with associated raster scan and high voltage generating electronics. As is understood, such a display device provides a generally rectangular raster scan of horizontal lines, alternate lines being interlaced on successive fields to provide a total of 525 scan lines. A composite video signal is provided to the display 11 as indicated at 15. This composite signal comprises the combination of a conventional sweep synchronization signal, provided by circuitry indicated at 17, and a video brightness signal generated by the apparatus described hereinafter and provided through a line 19. These signals are combined as indicated at 21.

For the purpose of encoding the data representing an image to be displayed on the display device 11, the display area is considered as being divided into rectilinear arrays of rows and columns of cells. Consistent with the aspect ratio of the conventional television display format, the array in the embodiment illustrated is assumed to be 30 cells high and 40 cells wide, each cell spanning 16 lines high in the vertical dimension and comprising 16 image points in width. Thus, only 480 lines of the possible 525 lines are actually utilized for the display. As will be understood by those skilled in the art, the conventional interlaced raster scan pattern will make eight scan lines within each horizontal row of cells, each of the 40 cells in the row being traversed successively during the scanning of each line. After all eight lines in one row are completed, the scan passes into the next row until a field is completed. On the next field, the remaining eight lines in each row are scanned in order, these lines being interlaced with the eight lines scanned during the previous field.

As indicated previously, each cell may comprise multiple image components, the several components being encoded in separate data words. Thus, the contributions of the several possible data words must be assembled or accumulated before the video signal is generated. In the embodiment illustrated, the accumulation is made once for each cell width traversed during a scan line, the accumulation function being provided by a 16-bit accumulator register 23. By means described in greater detail hereinafter, all the data words affecting a cell about to be scanned are decoded and their contributions to the current line are applied to the register 23 before that cell is scanned. As the point of scan leaves the preceding cell, the contents of register 23 are transferred in parallel to a 16-bit shift register 25 and are then read out serially to constitute the video signal on line 19. The shift register 25 is driven by an appropriate clock signal as indicated at 27, an appropriate clock rate being 12.6 magahertz in the case of a TV-type raster scan display.

As described in greater detail hereinafter, the data defining the image being displayed is kept in an encoded form for refresh storage and buffering prior to display and is fully decoded only just prior to video signal generation. Decoding is provided by three read-only memories (ROMs) 32–34, one of these memories (32) being used for vectors and the other two (33 and 34) being used for alphanumerics. As is understood, the present state of the integrated circuit art is such that read-only memories constitute a relatively fast and low cost method of obtaining complex decoding functions as opposed to assembling arrays of conventional logic gates for performing the same function. As the 16-bit by 16-bit cell size adopted in the present embodiment is appropriate for holding two alphanumeric characters, the read-only memories 33 and 34 are essentially duplicates, each serving to generate standard symbol patterns according to coded signals applied thereto. As is understood, such symbol decoding memories are conventional and require only a conventionally coded input of relatively few bits. Respective enable signals, designated VROM and SROM, are provided to the vector and symbol read-only memories, the vector read-only memories being disabled when the symbol read-only memories are enabled and vice versa.

Prior to being presented to the ROMs 32–34 for final decoding, the image defining data is held for storage and buffering in a pair of memories: a display memory 35 capable of holding, in computer compatible encoded form, the data necessary to define an entire image to be displayed; and a buffer memory 37 adapted to circulate data representing those image components in a single row of cells. As will be understood from the foregoing description, the data pertaining to a given row of cells will be utilized eight times for each field, i.e. for the eight successive scan lines, before the data pertaining to the next row of cells is required. This repetitive circulation is provided by the buffer memory 37. Each of these memories is of the serial or shift register type and each is provided with an input switch circuit so that the present data in the memory can either be recirculated or the memory can be loaded from an outside source. These switch circuits are indicated at 39 and 41 respectively and, as will be understood, comprise appropriate semiconductor switches rather than mechanical devices.

In the embodiment illustrated, the data held in the display memory is assumed to be encoded in 18 bit words in a computer compatible format described hereinafter. In order to hold sufficient data to define a complex image, the length of the memory is preferably in the order of 2k bits. Throughout this description, the numerical abbreviation *k* is used in its usual binary sense to mean 1024. The bits comprising each data word are presented in parallel at the output of the memory and thus the display memory is conventionally described as a $2k \times 18$ bit memory. In addition to the main portion of the display memory 35, there is also an output buffer register 40 which constitutes a further stage in the display memory storage loop. In FIG. 1 and the other schematic block diagrams referred to in this specification, data paths are represented by single lines even though the paths may in fact encompass multiple bit signal paths, the various bits being transmitted in parallel. For convenience, the number of bits present in various of the data paths is indicated by means of a number placed adjacent a slash mark crossing the path, in a manner conventional in the art.

The display memory 35 is operated as a sort of associative memory so that the size of memory required can be effectively based on the average image component density. In accordance with this system, a data word emerging from the display memory can be either image data or the address of the cell location to which the next image component data word pertains. Associated with the display memory 35 is a register 47 which holds the address of the cell to which the current data word present at the output of the display memory 35 pertains. Since, as noted previously, each cell may include several image components, the format of the image data words stored in memory 35 includes one bit which designates whether or not it is the last image component for the current cell. When the last image data word pertaining to a given cell is read out, the counter 47 is incremented to the next address. Correspondingly, when a cell address word is read out of the display memory 35, the register 47 is set to that address. The register 47 is provided with appropriate decoding logic to provide this function.

The format of the data words which circulate in the display memory 35 is illustrated in FIG. 4. As indicated previously, each data word may be either an address or data and the data words may describe either a vector segment or a pair of alphanumeric characters. In the address word, i.e. a word which designates the location of the next cell in which an image component is to be placed, bits 0–5 indicate the horizontal position of the cell within the rectilinear array ($X_0$–$X_5$), while bits 8–13 designate the vertical position of the cell within the array ($Y_0$–$Y_5$). Bits 6 and 14 are binary "1s", while bit 7 is the complement of bit 15. Meeting these latter conditions defines the word as being an address word, as opposed to a vector or alphanumeric data word. The conditions will not be met by either a vector or alphanumeric data word and thus uniquely identify an address word. The decoding circuitry associated with the register 47 tests for this condition before permitting any change in the current address value. The bits 16 and 17 define the class or type of address word in a manner facilitating the programming of a computer which loads the display terminal memory. In one particular embodiment of the invention, the following code was used: 0,0 indicated the end of a memory string, i.e. the end of a frame; 0,1 indicated a protected address, i.e. an address which cannot be changed under operator control alone; 1,0 indicated a normal address word; and 1,1 indicated the beginning of a memory data string, i.e. the beginning of a frame.

For vector data words, bits 8–11 indicate a START X value (SX), while bits 12–15 indicate a START Y value (SY). These values define the starting point for a vector segment falling entirely within the respective cell. Bits 0–3 designate a value END X (EX) defining the X value of the vector segment end point, while bits 4–7 define a value ΔY (DY) which indicates the difference or change between the START Y value and the Y value at the end of the vector segment. As will be apparent hereinafter, the use of a Δvalue instead of an absolute address for the end Y definition facilitates the programming operation of the system. Bit 16 designates whether or not the word is the last item to be entered into a cell, i.e. the end cell (EC) bit mentioned previously. The bit 17 is available for control functions not forming a part of the present invention, e.g. a blink mode of operation. The coding format is such that ΔY is always positive, the vector being considered as being drawn from top to bottom, while either of the X values may be the larger. As will be understood by those skilled in the art, this format is computer compatible so that if the data held in the display memory is read back to a host computer, as indicated at 30 in FIG. 1, it can be analyzed and modified or supplemented relatively straightforwardly under program control.

For the alphanumeric words, the bit positions 0–6 define the right hand character, while the bit positions 8–14 define the left hand character. The bits 7 and 15 are binary 1s and this condition does not occur in either of the other classes of words. This code uniquely defines the alphanumeric words. Bits 16 and 17 provide the end of cell (EC) and optional control functions (B), as with vector words.

As described hereinafter, data is periodically transferred from the display memory 35 to the buffer memory 37. At any one time, the data corresponding to one row of cells is transferred. Prior to being entered into the buffer memory loop, data being transferred from the display memory 35 is pre-processed as indicated generally at 43, with the individual data words being expanded and modified in format. The pre-processing expands each data word to 23 bits and thus the buffer memory 37 is constructed to handle 23 bit words, again the several bits making up each word being handled in parallel.

The loop through which data in the buffer memory is circulated includes, in addition to the serial memory 37 itself, a vector processor 45 having input and output registers 46 and 48. The input register 46 and the output register 48 constitute further stages in the serial loop around which data circulates through the buffer memory. In the embodiment illustrated, the total number of stages is selected to be 320, i.e. allowing eight picture elements for each cell in a row, and thus the serial buffer memory 37 itself comprises 318 stages. An alternative embodiment permitting a somewhat smaller buffer memory is briefly described later herein.

Since the raster scan of the display device 11 proceeds as a fixed function of time, the circulation and entering of data relative to the buffer memory 37 is, in effect, slaved to the raster scan timing. A master clock 49 drives a succession of counters 51–55, the values held in these counters being definitive of the location of the scan at any given point in time. Clock 49 also provides the output timing clock signals to the readout shift register 25 and the sync-signal generator 17. The value in counter 51 may be considered the current dot position on the χ or horizontal axis, i.e. the position of the scan on a given line within the current cell, designated TVX. The value held in the counter 52 may be considered to be the location of the current cell within the current row, while the value within the counter 53 may be taken as the designation of the line within the current row, designated TVY. Likewise, the value in the counter 54 may be taken as the designation of the current row, i.e. out of the 30 possible, while counter 55 may be designating whether the scan is on an odd field or an even, i.e. interlace, field.

As suggested previously, the buffer memory 37 is reloaded with fresh data during the first line scan in each row of cells, i.e. from the display memory 35 through the pre-processor circuitry 43. As the data being transferred emerges from the output register 48 of the vector processor 45, it is provided to the final decoding circuitry, the ROMs 32–34, simultaneously with its application to the input of the buffer memory 37. On the next seven scan lines in the row of cells, it is data which has been recirculated around the buffer memory which is provided to the decoding circuits to generate the video signal. As there is only a relatively short interval between the completion of one line scan and the start of the next, the data being circulated must be arranged or timed with respect to the buffer memory loop timing so that the data pertaining to the first cell in a row must not be very far behind that pertaining to the last cell in a row. Otherwise, insufficient time might exist for the serial memory to be stepped to provide the first cell data in time to load the accumulator 23 before the next scan line actually begins. To avoid such a situation, blank words are loaded into the buffer memory during the transfer of data from the display memory to the buffer memory when fewer than the maximum number of words possible for each cell are actually present in the data stream coming from the display memory. The blank generator is indicated generally at 59 while the control circuitry which correlates the sequencing of the buffer memory, the blank generator and the selector switching circuitry 41 is indicated generally at 61.

The display memory 35 is sequenced by control circuitry indicated at 63. This control circuitry operates the memory to load the buffer memory 37. A comparator 64 compares the cell address corresponding to the data current available from the memory loop with signals from the counters 51–55 indicating the current position of the raster scan and, on the basis of this comparison, signals the control circuitry to advance the contents of the memory so that the data needed next will be made available. Basically, the operation of the display memory is such that its contents are read out only during the first scan line in each row and are advanced only to transfer data words into appropriate time slots within the circulating buffer memory data string, intervening slots being filled with blank words when fewer than the maximum number of data words are provided for each cell.

As indicated previously, the present state of the art readily permits the generation of alphanumeric symbols on a raster scan display from coded data. Thus, in being transferred from the display memory to the buffer memory and circulated around the buffer memory, the data representing such symbols requires no further decoding or modification. However, in accordance with one aspect of the present invention, the data used to generate arbitrary vectors undergoes a progressive modification as it circulates around the buffer memory in order to determine, for each scan line, the picture elements or points which correspond to that vector. The processor 43 provides an initial modification of the data words so that the data is in a form which facilitates subsequent progressive modification during the repetitive circulations. The processor 43 changes each data word format that shown in FIG. 4 to the respective form shown in FIG. 5. In the case of data words representing alphanumerics, the format is essentially unchanged, the additional bit positions being essentially unused. With respect to data words representing vectors, the format of the data word in the circulating buffer loop depends upon the location of the vector and whether the raster scan has reached or passed the vector. In other words, while a vector segment may begin at the left hand upper corner of a cell, it may also begin at an arbitrary point spaced away from either horizontal or vertical edges and may end within the cell. The four different situations provided for are indicated in FIG. 5 and are designated vector before start; vector at start; vector while running; and vector when done. This latter word format is also used as a blank word for the purpose of filling in the data chain.

Figure 3:
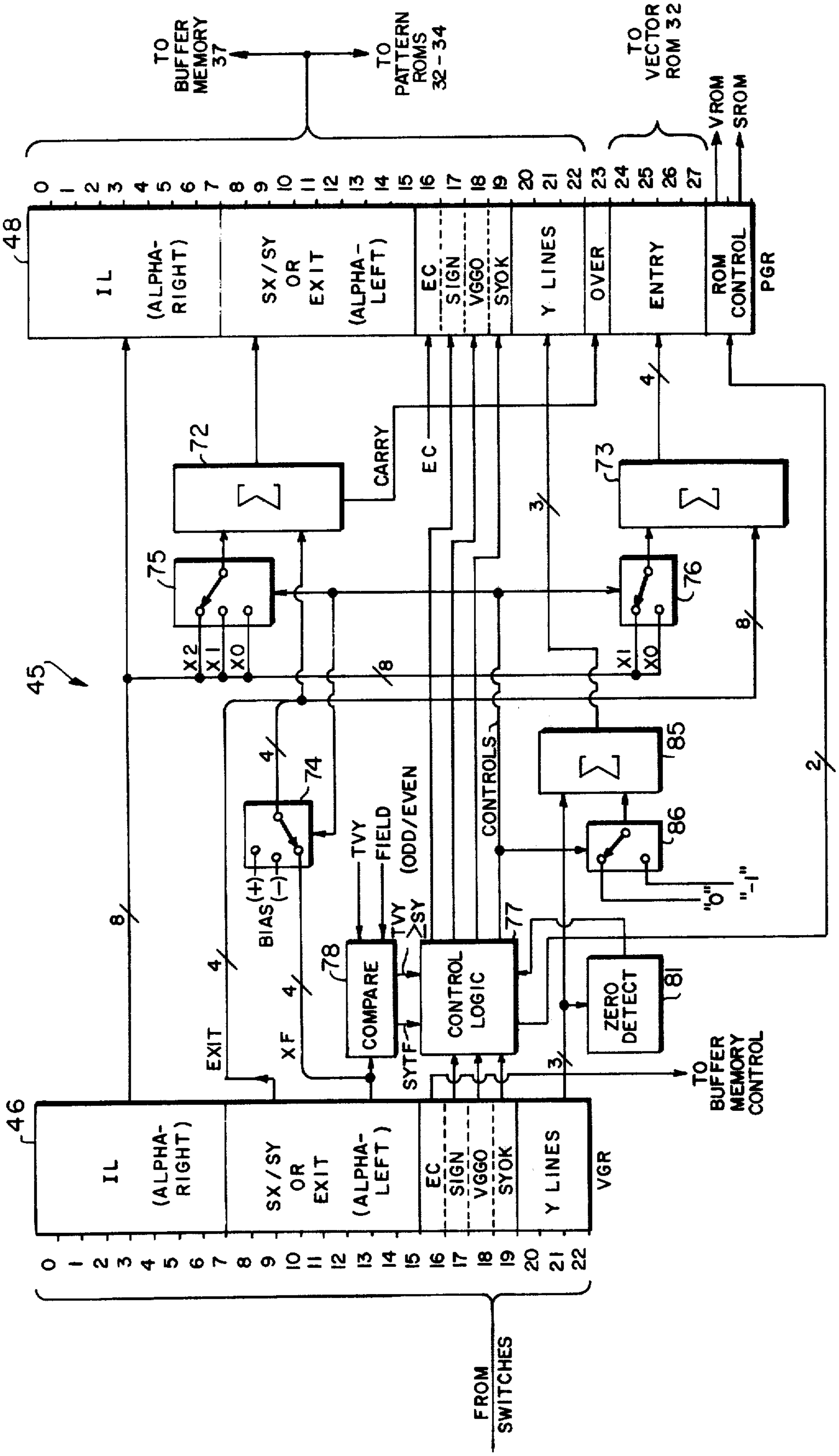
FIG. 3 is a schematic block diagram of a vector data word progressive processor employed in the system of FIG. 1.

The pre-processor circuitry 43 is illustrated in greater detail in FIG. 2. This circuitry utilizes the START X, START Y, END X and ΔY values provided by the display memory data word format to generate certain other values which are then incorporated into the buffer memory word format. These further values include a value, designated Y LINES, which occupies bit positions 20–22 as shown in FIG. 3. The value Y LINES is essentially equal to one less than the number of lines in which the vector segment has some effect for each field. The Y LINES value is obtained in the following manner. The ΔY value is halved as indicated at 65. The result is summed as indicated at 66 with the resultant of ANDing the odd field signal (ODD) with the least significant bit of ΔY, as indicated at 67. As explained in greater detail hereinafter, the Y LINES value is employed merely as a down counter to terminate the vector if it should end within the cell before the last line, this value being decremented on successive circulations of the data word around the buffer memory.

A value representative of or corresponding to the slope of the vector segment is obtained by first generating a ΔX value as indicated at 68 in FIG. 4 and obtaining the quotient of that value with ΔY. This division is preferably performed in a lookup manner by another read-only memory (ROM), as indicated at 69. In general, it may be noted that the slope determines how many bit positions or image points should be lit up on a given line. In other words, the shallower the slope, the more bit positions should fall on each scan line to produce a vector of substantially uniform width and brightness. Thus, the slope value can also be considered to be an intersect length. With reference to FIG. 5, this value obtained from the division occupies bit positions 0–8 and is designated intersect length (IL). The sign of the slope, i.e. positive or negative, is represented in bit position 17. A switch 70 allows the bits representing the right hand alphanumeric character to pass unchanged through the pre-processor if the data word is not a vector data word. Bit positions 8–15 represent the START X (SX) and START Y (SY) values in the case of vector data words and the left hand character in the case of an alphanumeric data word. In either case, no modification occurs in the pre-processor.

A control bit generator 71 tests each incoming data word to determine the class of output word which should be generated (vector or alphanumeric) and, if a vector is involved, the status of the vector within the cell at the start. Corresponding control bits are then generated and entered into bit positions 17–19 in accordance with the formats illustrated in FIG. 5. The functions of these control bits are described in greater detail hereinafter with reference to FIG. 3. This then illustrates the basic change in format of vector data words in transferring between the display memory loop and the buffer memory loop.

Upon successive circulations around the buffer memory loop, changes in values in the vector data words occur, together with minor changes in format. The changes are provided by the vector processing circuitry 45. This circuitry is illustrated in greater detail in FIG. 3. As noted previously, the buffer memory loop operates with words of 23 bit length. The processor 45 operates not only to generate 23 bits which then comprise the modified data word which is re-entered into the buffer memory 37 but also another 4 bit value which is used in generating the image elements for the current scan line. The additional value is designated the ENTRY value. Certain control signals or bits are also generated. Accordingly, the output register 48 for the processor 45 comprises 30 bit positions, though only 23 of the bits are recirculated through the buffer memory.

As indicated in FIG. 5, the data format changes somewhat once the vector has been reached by the raster scan. Once the vector has been started, the start location values (SX, SY) are no longer needed. Accordingly, these bit positions are then used to represent the a value which is essentially the current location of the vector, in the X or horizontal direction, within the cell. The current X position is calculated on each pass from the previous current position and the intersect length (IL). To obtain a best digital fit for each vector, fractional values are preserved from pass to pass even though only the most significant bits are used on each pass. The 4 most significant bits of the current X position occupy bit positions 8–11 and are designated the EXIT value while the residual fraction occupies bit positions 12–15 and is designated XF. Since the Y-LINES value determines when the vector segment ends in each field, it is not necessary to use the END X (EX) value in the data circulating the buffer loop.

The vector processor 45 is illustrated in FIG. 3. As indicated, bits 1–7 pass without change from the entry register 46, also designated the vector generator register VGR, to the output register 48, designated the pattern generator register PGR. In the case of a vector data word, these bits represent the intersect length, while in the case of alphanumeric symbols, these bits represent the right hand character. The vector processor 45 includes a pair of binary digital adders 72 and 73. One input to each adder is a binary value taken from the incoming value represented in bit positions 8–15 in the input register 46. In the case of an alphanumeric word or a vector word representing a vector segment which has not yet been reached, the eight incoming bits are applied unchanged to the adder. In other words, the selector switch 74 is in its lowermost position, as shown in the drawing. In the case of a vector data word representing a vector which is just being encountered, the eight bits applied to the adders comprise, as the four most significant bits, the START X value (SX) plus a bias value approximately equal to one-half the least significant bit in the value SX. The bias is added or subtracted in dependence on whether the slope is positive or negative. The switch 74 is operated by control logic 77 which determines certain conditions described in greater detail hereinafter. During the running of the vector segment, the bit positions 12–15 are again passed to the adders 72 and 73 unchanged, these bit positions then representing the preserved fractional position (FX) in the X or horizontal dimension relative to the cell.

Each of the adders 72 and 73 sums the incoming eight bits derived from positions 8–15 of the input register with a selected multiple of the intersect length (IL). In the case of adder 72, this multiple may be zero, one or two times the intersect length, and in the case of the adder 73, this multiple may be either zero or one times the intersect length. These selections are made by switches operated schematically at 75 and 76. Again, the selector switches, while shown as mechanical pointers, will be understood to in fact comprise appropriate semiconductor switch elements. Since the input signals to the switches are in binary form, the multiplication indicated can be performed merely by shifting bit positions as will be understood by those skilled in the art. The 8-bit output of the adder 72 comprises the data in bit positions 8–15 of the data word which is then recirculated through the buffer memory 37, while the carry bit, if generated, provides a control bit indicating an overflow condition and does not form part of the recirculating data word. Depending upon the particular arrangement employed for the decoding, the overflow bit may be applied to the vector decoding ROM 32 to prevent an ambiguous command when the ENTRY value exceeds 4 significant bits.

The four most significant bits obtained from the adder 73 form the ENTRY value which constitutes one of the coded inputs or arguments provided to the vector decoding ROM 32 for use in generating the picture elements affecting the current line.

The Y LINES signal is applied to a zero value detector 81. The ZERO signal obtained from the detector is applied as a further input to the control bit operator circuitry 77 for changing the state of the control bits when the end of a vector is reached. The Y LINES signal is also applied to an adder 85 together with either a 0 or −1 chosen by a control switch 86 so that its value can be selectively decremented by one at the output.

The functions provided by the control logic 77 are represented in FIG. 6, where input values or states occurring in various situations are indicated on the left hand side of the chart and the corresponding output signals or states are indicated on the right hand side of the chart. Briefly stated, the functions or meanings of the various control signals are as follows: A binary one in the bit position SYOK indicates that a vector is to be run but is not yet running; a one in bit position VGGO indicates that a vector is starting or in the process of being run. As indicated previously, the SIGN bit represents the polarity or direction of the slope of the vector segment but is a one in the case of alphanumeric words and a zero when a vector is completed. Associated with the control logic 77 is a comparator 78 which, on each pass before the start of a vector, compares the value SY with the current location of the scan within a row as defined by the signals TVY and FIELD (ODD/EVEN) to generate various intermediate control signals. The signal $TVY \geq SY$ indicates when the raster scan has reached or passed the line corresponding to the value SY. The signal SYTF, representing SY THIS FIELD, indicates whether the value SY occurs on a line in the current field rather than the field interlaced with the current field. The signal Y-LINES =0 indicates when the value Y-LINES (bit positions 25–27) has been decremented to zero, as described previously, to indicate that the vector is completed.

On the output side of FIG. 6, the various circulated control bits and resultant control signals are indicated in corresponding manner while the settings of the switches 75 and 76 are indicated in straightforward manner. The signals which enable the vector decoding ROM 32 and the symbol ROMs 33 and 34 are represented at VROM and SROM, respectively.

As indicated previously, when data words representing alphanumeric characters are being processed, it is not necessary to perform any successive modification of the data word during circulation of the word around the buffer memory loop down the several lines comprising each cell. Thus, as also indicated in the control logic functions defined in FIG. 6, the switches 74–76 are set so that bits 0–15 of the output register will reflect the same data usually entered in bits 0–15 of the input register. During successive circulations, these bits 0–7 are decoded by right hand symbol ROM 34 and bits 8–15 are decoded by the left hand symbol ROM 33 so as to generate the requisite patterns on each scan line, such decoding being conventional in the art. In FIG. 6, the symbol $\phi$ indicates a "don't care" condition.

Assuming that the control logic 77 performs the functions indicated in FIG. 6, the operation of the vector processor 45, to generate a representative vector segment during interlaced raster scanning is substantially as follows. In this description, reference is made to FIGS. 7 and 8 where the states and values in the input register 46 and output register 48 are given for successive scan lines in the odd field and even field, respectively, and to FIG. 9 where the resultant image generated on the display screen is represented. In the illustrated example, the vector segment is assumed to be specified by the values:

$SX = 2$
$EX = 13$
$SY = 4$
$\Delta Y = 5$

From these values and the description of the preprocessor given previously, it can be seen that the intersect length (IL) should be essentially equal to 2.00 in the base ten number system or 0010.0000 in the binary number system.

Starting with the even field, i.e. lines 0, 2, 4, etc., it can be seen that no image elements are generated until the current scan line value TVY, obtained from the timing counter 53, exceeds the value SY in the data word. When this condition is met on scan line 4, the value SX with the positive bias of 0.5 is applied to the adder 73 where it is summed with zero times the intersect length (IL) to obtain an ENTRY value of 2.5. In the adder 72, this same value (SX + bias) is summed with one times the intersect length (IL) to obtain an EXIT value of 4.5. The vector decoding ROMs are enabled by the control signal VROM.

Figure 9:
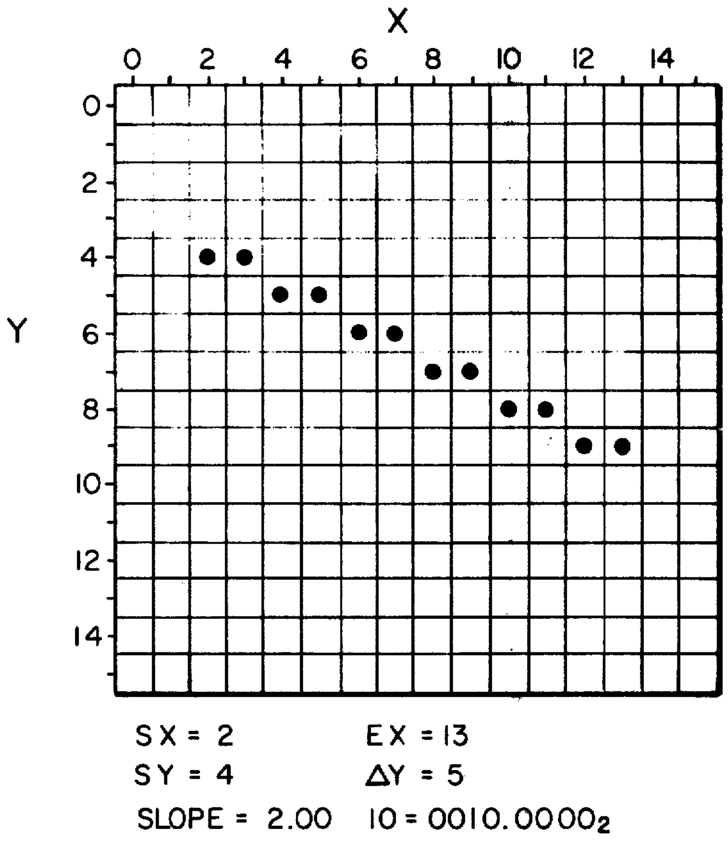
FIG. 9 is a chart indicating the manner in which the vector segment is displayed by the raster scan.

As indicated previously, the vector decoding ROM operates to generate a 16-bit parallel output in response to coded input signals applied thereto, i.e. the ENTRY and EXIT values. With reference to FIG. 9, the vector decoding ROM 32 performs a decoding function such that a picture element is generated in all bit positions between the ENTRY value and the EXIT value, including the ENTRY value but excluding the EXIT value. Thus, on line 4, bit positions 2 and 3 are lit.

On line 6, the previous EXIT value is summed in the adder 73 with one times the intersect length to obtain an ENTRY value of 6.5. In the adder 72, the previous EXIT value is summed with two times the intersect length to obtain a new EXIT value of 8.5. The same process occurs on line 8 to obtain ENTRY and EXIT values of 10.5 and 12.5, respectively. Accordingly, on line 6, bit positions 6 and 7 will be energized, while on line 8, bit positions 10 and 11 will be energized.

During the scanning, the value Y-LINES is decremented on each pass and when a zero is detected, the vector decoding ROM is disabled and no further picture elements are generated.

Turning now to the odd field, no picture elements are generated on lines 1 and 3 since the value TVY is not greater than the value SY in the circulating data word. On line 5, however, the vector decoding ROMs are enabled. Also on line 5, the value SX, together with the positive bias of 0.5, is summed in the adder 73 with one times the intersect length (IL) to give an ENTRY value of 4.5. Also, the value SY plus bias is summed with two times the intersect length in the adder 72 to give an EXIT value of 6.5. Accordingly, the vector decoding ROM provides output signals energizing bit positions 4 and 5 in line 5. On lines 7 and 9, the ENTRY value is in each case obtained by summing the previous EXIT value with one times the intersect length (IL). The new EXIT value is obtained by the summing of the previous EXIT value with two times the intersect length (IL). Accordingly, on line 7, bit positions 8 and 9 are energized, while on line 9, bit positions 12 and 13 are energized. As on the even field, the value Y-LINES is decremented during each pass and when a zero is detected, the vector segment is terminated, the vector decoding ROMs are disabled and no further changes are made in the circulating data word.

The purpose of the bias value added during the initial scan line on which the vector segment is present is to cause a carry to be generated from the fractional portion (FX) to the EXIT value when the contribution of the fractional value of the repeated summing of the intersect length value exceeds 0.5. This is necessary since only the most significant bits of the EXIT value are applied to the decoding ROM, without rounding off. In cases where the slope is an uneven value, this method of obtaining carries produces the best digital fit so that line segments appear straight as possible without unsymmetrical break points.

As indicated previously, each data word, as in the example just described, can represent a single short straight vector falling within a cell. However, since a plurality of such vector segments can be put in each cell, curved lines or otherwise complex images can be built up piece-wise. As also indicated previously, the contributions from each vector segment are accumulated or assembled for each scan line in the cell in the 16-bit digital accumulator or assembler 23 before being transferred to te parallel-to-serial converting register 25 for feeding into the video signal.

Since the buffer memory loop is re-loaded from the display memory during the first scan line in each row of cells, on each field, it is not necessary to preserve any of the original data in the buffer memory from previous scannings of the same cell so that the fact that the data has been permuted and changed on successive scan lines within any one field does not mean that the data is lost from the system in any meaningful sense.

As may be seen, the parallel-to-serial conversion which occurs after accumulation and various other transfers occurring within the apparatus described above will introduce various timing offsets within the operations of different parts of the system which are not described in detail herein. In other words, during the loading of the buffer memory from the display memory during the initial scan line in a row of cells, the display memory will complete the line slightly before the vector processor has completed that line and, likewise, the vector processor will finish the line slightly before the video system actually completes this scan line. As will be understood by those skilled in the art, these various minor time offsets will vary depending upon the particular embodiment constructed. An accommodation of these offsets is within the skill of the art and, accordingly, such minor variations are not described herein since they form no part of the invention itself.

In the foregoing description, the operation of the buffer memory loop was predicated on an embodiment in which the length of the buffer memory loop was 320 bits. However, the closest standard serial memory length commercially available is 256 bits. Using such a memory, a storage loop of a total of 258 bits can be constructed, again taking into account the input and output registers associated with the vector processor circuitry 45. Since the statistical chance of needing maximum number of any image components (8) in each and every cell is minuscule, such a shorter serial memory can be utilized if some means is provided for conditioning the insertion of blank words into the data string so that no excessive gap or crowding develops in the circulating data stream. Such a provision can be made by employing a counter which can be considered to be a word deficit counter. This counter is then preset to a value of 64 at the start of the transfer of a new row of information from the display memory to the buffer memory. As the data relating to each cell is processed and decoded for display, the buffer memory is stepped only to accept each data word, but no blank words are generated so long as the value held in the deficit counter is greater than 0. However, for each time interval which passes during which a blank could have been inserted, but was not, the deficit counter is decremented by 1. Then, when the value in the deficit counter reaches 0, blank words are introduced into the data string being transferred at each opportunity, just as in the previous embodiment. Thus, the data pertaining to the first cell in a row will follow closely behind the data pertaining to the last cell in the row in the circulating data stream. Alternative methods of reducing timing problems include using a random access memory for the buffer memory or the addition of further stages of buffering at the image component accumulator stage so that even greater time averaging is available.

Summarizing then, the operation of this system is essentially as follows: The serial display memory 35 is loaded from a host or controlling computer with data which is in a relatively conventionally encoded format, that is, each vector segment is defined essentially by its beginning and end points in a rectangular coordinate system. Since the display memory at all times retains this data in this computer compatible form, it is not necessary for the controlling computer to have a separate, equivalent data stored in its memory. In other words, the contents of the display memory can, at any time, be read back into the computer and there analyzed and modified under program control before being re-entered into the display memory. This playback can either occur during the normal circulation occurring over a scan cycle or the contents of the display memory can, under independent control, be circulated with interruption during the retrace time between frames. This latter period will normally be entirely long enough for this purpose.

At the start of a given row of cells, the display memory feeds the data pertaining to that row into the buffer memory through the pre-processing circuitry. The pre-processing circuitry transforms the data in a way which facilitates its subsequent utilization by the vector processing circuitry. During the transfer from display memory, the distribution of data words in the circulating data stream is adjusted by the introduction of blank words into the data stream so that the data pertaining to the beginning and end cells in the row lie adjacent each other in the circulating data stream.

As the expanded data is entered into and circulated around the buffer memory, it is provided to the pattern generating circuitry where the final decoding occurs. As explained previously, this postponing of the final decoding process to the very last stage of scan conversion is facilitated by the use of the system of the present invention which permits multiple image components to be placed in each single cell so each image component can be of relatively simple form capable of being defined in a relatively compact data format. Similarly, the total memory size required for image refreshing is reduced since the display memory need only be of a size based on the average image component density over the entire display area. Further, though the buffer memory must be of a length more closely approximating the maximum or "worst case" length, the data words being circulated are still in a partially encoded form so that the memory is not nearly of the size as would be required if there were a one-for-one correspondence with the total number of image elements (dots), as in some prior art systems. This reduction is permitted by providing final decoding only at the final image assembling stage.

While the system of the present invention has been described with reference to a cathode ray tube in the particular embodiment illustrated, it should be understood that this system of coding and scan conversion can also be applied to facsimile reproduction and such use should also be considered to be a form of display as that term is used herein.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

We claim:

1. Apparatus for repetitively generating a video signal for driving a raster scan display from data encoded in data words representing respective vector segments, the raster scan being divisible into an angular array of rows and columns of cells, each vector segment, as encoded, lying within a single cell with more than one image component being permissible per cell, each word being encoded in a form defining starting point, slope and length in one dimension; said apparatus comprising:

a serial, circulatory memory for holding, in cell order, data words defining an image to be displayed;

means for selectively advancing the contents of said memory to read out all data words pertaining to a given cell;

means for modifying each data word during the initial scan line traversing the vector segment to generate entry and exit values defining the picture element positions in that line affected by the vector segment, the exit value replacing the starting point values in the data word during subsequent circulations, and for progressively modifying each data word during successive scans to generate, from the previous exit value and the slope, new entry and exit values defining the picture element positions affected by the vector segment on each respective scan line;

decoding means for generating, from the entry and exit values obtained from each data word successively read out, signals defining the corresponding image element positions affected by the respective vector segment;

an accumulator register for accumulating data representing the contributions made by a succession of data words pertaining to a given cell; and means for serially reading out data accumulated in said register as a video signal to said display.

2. Apparatus for repetitively generating a video signal for driving a raster scan display from data encoded in data words representing respective image components, the raster scan being divisible into a rectilinear array of rows and columns of cells, each image component, as encoded, lying within a single cell with more than one image component being permissible per cell; said apparatus comprising:

a serial refresh memory for holding, in cell order, the data words defining an entire image to be displayed;

a serial row memory for holding, in cell order, the data words pertaining to a current row;

means for selectively advancing the contents of said row memory until all data words pertaining to the next cell to be scanned have been read out;

means for decoding the data words successively read out of said row memory to generate signals defining the corresponding image elements pertaining to the current raster line;

an accumulator register for accumulating the picture elements defined by a succession of data words;

a transfer register to which data held in said accumulator register can be transferred;

means for serially reading out data held in said transfer register as a video signal to said display; and means for transferring, from said refresh memory to said row memory, the data representing those image components falling within the next row when the last line in the previous row has been completed.

3. Apparatus as set forth in claim 2 wherein data words stored in said refresh memory and representing vector segment are encoded in a format defining start and end points of the vector segment and wherein said transferring means includes circuitry for determining a value which varies as a function of the slope of the vector segment.

4. Apparatus as set forth in claim 3 including vector processing means operative during each circulation of data through said row memory for adding a multiple of said value to a cumulative value represented in the respective dataword, the start point value being used in place of the cumulative value on the initial scan line traversing the vector segment.

5. Apparatus as set forth in claim 2 wherein said transferring means includes means for entering blank data words in the data stream being entered into the buffer memory in the absence of transferred data words sufficient to substantially fill said buffer memory.

6. Apparatus for repetitively generating a video signal for driving a raster scan display, the raster comprising a predetermined number of essentially parallel scan lines, the display area being divisible into a rectangular array of rows and columns of cells, each row being essentially parallel to and encompassing a plurality of said scan lines;

a serial, circulatory refresh memory for holding, in cell order, data words representing an image to be displayed, each data word representing a respective image component falling entirely within the respective cell, said components including alphanumeric characters and vector segments, said vector segments being encoded in a form defining starting point and end point within the respective cell;

a serial, circulatory row memory for holding, in cell order, data words pertaining to a row;

means for transferring data words from said refresh memory to said row memory including decoding means operating on data words representing vector segments to derive a value which is a function of the slope of the vector segment, said value being included in the corresponding data word being entered into said row memory;

means for advancing said row memory, prior to the scanning of each cell on each line, to read out all data words pertaining to that cell;

processing means, operative during successive circulations of data words in said row memory, for processing each data word representing a vector segment to generate values representing the starting and end points of the intersection of the vector segment with the then current scan line;

means for decoding each data word read out of said row memory to generate a set of parallel signals, one for each picture element position in the row for that cell, defining the picture element positions affected by the respective image component;

an accumulator register for assembling data representing the contributions, to the current line, of all data words pertaining to the cell;

a transfer register to which data held in said accumulator register may be transferred;

means for serially reading out data held in said transfer register as a video signal to said display; and means for operating said transferring means to transfer, from said refresh memory to said row memory, the data representing those image components falling within each row during the scanning of the first line of that row.

7. Apparatus for repetitively generating a video signal for driving a raster scan display, the raster comprising a predetermined number of essentially parallel scan lines, the display area being divisible into a rectangular array of rows and columns of cells, each row being essentially parallel to and encompassing a plurality of said scan lines;

a serial, circulatory refresh memory for holding, in cell order, data words representing an image to be displayed, each data word representing a respective image component falling entirely within the respective cell, said components including alphanumeric characters and vector segments, said vector segments being encoded in a form defining starting point and end point within the respective cell;

a serial, circulatory row memory for holding, in cell order, data words pertaining to a row;

means for transferring data words from said refresh memory to said row memory including decoding means operating on data words representing vector segments to derive a value which is a function of the slope of the vector segment, said value being included in the corresponding data word being entered into said row memory;

means for advancing said row memory, prior to the scanning of each cell on each line, to read out all data words pertaining to that cell;

means for modifying each data word representing a vector segment during the initial scan line traversing the vector segment to generate entry and exit values defining the picture element positions in that line affected by the vector segment, the exit value replacing the starting point values in the data word during subsequent circulations, and for progressively modifying each data word during successive scans to generate, by summing the previous exit value with multiples of the slope, new entry and exit values defining the picture element positions affected by the vector segment on each respective scan line;

decoding means for generating, from the entry and exit values obtained from each vector segment data word successively read out, a set of parallel signals, one for each picture element position in that row in the cell, which signals define the corresponding image element positions affected by the respective vector segment;

decoding means for generating from each alphanumeric data word read out a set of parallel signals, one for each picture element position in that row of the cell, which signals define the corresponding image element positions affected by the respective character;

an accumulator register for accumulating data representing the contributions to the current line made by a succession of data words pertaining to each cell;

a readout register to which data held in said accumulator register may be entered;

means for serially reading out data held in said readout register as a video signal to said display; and means for operating said transferring means to transfer, from said refresh memory to said row memory, the data representing those image components falling within each row during the scanning of the first line of that row, said operating means including means for entering blank data words in the data stream being entered into the circulatory row memory in the absence of transferred data words sufficient to substantially fill said row memory.

8. Apparatus for repetitively generating a video signal for driving a raster scan display, the raster comprising a predetermined number of essentially parallel scan lines, the display area being divisible into a rectangular array of rows and columns of cells, each row being essentially parallel to and encompassing a plurality of said scan lines;

a serial, circulatory row memory for holding, in cell order, data words pertaining to a row, each data word including values defining: the current position of the vector within the respective cell in a direction along the scan line and the effective length of the intersection of the vector with the scan line;

means for advancing said row memory, prior to the scanning of each cell on each line, to read out all data words pertaining to that cell;

processing means, operative during each circulation of a data word around the row memory, for adding twice the intersection length to the previous current position to obtain a new current position which is then substituted in the circulating data word and for adding the intersection length to the previous current position to obtain an entry value;

decoding means for generating, from each pair of entry and current position values, a set of parallel signals, one for each picture element position in the row within the cell, which signals define the corresponding image element positions affected by the respective vector;

an accumulator register responsive to the signals generated by said decoding means for accumulating data representing the contributions to the current line made by a succession of data words pertaining to each cell;

a readout register to which data held in said accumulator register may be entered; and means for serially reading out data held in said readout register as a video signal to said display.

9. The method of generating a video signal for driving a raster scan display from data encoded in data words representing respective image components, the raster scan being divisible into a rectilinear array of rows and columns of cells, each image component, as encoded, lying within a single cell; said method comprising:

storing in a serial, circulatory refresh memory, in cell order, the data words defining an entire image to be displayed, the data words which are stored in the refresh memory and which represent vector segments being in a format including values defining start and end points of the vector segment;

storing in a serial, circulatory row memory, in cell order, the data words pertaining to a row;

during the first scan line in each row, transferring from said refresh memory to said row memory the data words pertaining to that row and, during transferring from said refresh to said row memory, processing the data words to determine a value which varies as a function of the slope of the vector segment, the slope values being included in the data word format employed in the row memory;

during each raster line scan, advancing the contents of said row memory until all data words pertaining to the next cell to be scanned have been read out and decoding the data words successively read out of said row memory to determine the corresponding image elements pertaining to the current raster line;

accumulating for each scan line in each cell the picture elements defined by a succession of data words; and after accumulation, serially reading out the composite of said picture elements as a video signal.

10. The method of claim 9 wherein, during each circulation of data around said row memory, a multiple of the slope value is added to an accumulated value represented in the respective data word, the start point value being used in the place of an accumulated value during the initial scan line traversing the vector segment.

* * * * *